United States Patent [19]
Thyzel

[11] Patent Number: 5,258,992
[45] Date of Patent: Nov. 2, 1993

[54] LASER TUBE FOR A GAS LASER

[76] Inventor: Reinhardt Thyzel, Obere Bergstr. 3, D-8501 Heroldsberg, Fed. Rep. of Germany

[21] Appl. No.: 895,887

[22] Filed: Jun. 10, 1992

[30] Foreign Application Priority Data

Jun. 10, 1991 [DE] Fed. Rep. of Germany .... 4119025.4

[51] Int. Cl.$^5$ .............................................. H01S 3/03
[52] U.S. Cl. ...................................... 372/61; 372/107
[58] Field of Search .................. 372/61, 107, 55, 65, 372/103, 99

[56] References Cited

U.S. PATENT DOCUMENTS

| | | |
|---|---|---|
| 4,807,839 | 2/1989 | Nettleton et al. ................... 372/107 |
| 4,815,093 | 3/1989 | Wollermann-Windgasse et al. ............................................ 372/61 |
| 4,833,685 | 5/1989 | Boscolo et al. ...................... 372/61 |
| 4,878,227 | 10/1989 | Ackermann et al. ................ 372/107 |
| 4,891,818 | 1/1990 | Levatter ................................. 372/61 |
| 4,947,399 | 8/1990 | Sheldon et al. ...................... 372/107 |

Primary Examiner—Georgia Y. Epps
Attorney, Agent, or Firm—Evenson, McKeown, Edwards & Lenahan

[57] ABSTRACT

A laser tube for a gas laser that has on at least one end side a tube flange for the detachable fastening of a laser window or of a laser mirror. The laser tube has a first adjusting flange that is gastightly mounted on the tube flange, an elastic tube-shaped element, in the interior of which the laser beam extends, and which is gastightly connected with the adjusting flange. On its other end, the tube-shaped element is gastightly connected with a second adjusting flange at which a mirror flange is gastightly mounted which carries the laser window or the laser mirror. Between the two adjusting flanges, at least two adjusting screws and at least one element which generates a restoring force are inserted.

14 Claims, 1 Drawing Sheet

LASER TUBE FOR A GAS LASER

BACKGROUND AND SUMMARY OF THE INVENTION

The present invention relates to a laser tube for a gas laser which, on at least one end face, has a tube flange for the detachable fastening of a laser window or of a laser mirror.

For lasers which operate in a sealed-off vacuum, such as inert-gas lasers, other gas lasers and particularly $CO_2$ wave guide lasers, it is required that internal mirrors be mounted as closely as possible to the ceramic material or glass of the laser tube.

Furthermore, it is not only advantageous for the windows or mirrors closing off the laser tube for a gas laser to be removable, but also to be easily adjustable after a remounting of cleaned or exchanged windows or mirrors. As a result, for example, the manufacturing and the servicing of laser tubes is simplified significantly. In addition, it is required that, during servicing, an installed mirror can be adjusted without any demounting.

The known arrangements of laser tubes of gas lasers with removable and readjustable end mirrors have the disadvantage that they require high manufacturing expenditures and are therefore comparatively expensive or that they, (for example, with crimp or upset connections), allow only a comparatively cumbersome adjusting.

It is an object of the present invention to provide a laser tube for a gas laser which, at least on one end face, has a tube flange for the detachable fastening of a laser window or of a laser mirror, in such a manner that the laser window or the laser mirror can be easily adjusted.

This and other objects are achieved by the present invention which provides a laser tube for a gas laser that has a tube flange on at least one end face of the gas laser for the detachable fastening of at least one of a laser window and of a laser mirror. The laser tube has a first adjusting flange that is gastightly mounted on the tube flange, and an elastic tube-shaped element, in the interior of which the laser beam extends, which is gastightly connected at a first end with the first adjusting flange. A second adjusting flange is gastightly connected at a second end of the tube-shaped element. A mirror flange is gastightly mounted to the second adjusting flange and carries at least one of the laser window and the laser mirror. At least two adjusting screws are arranged between the first and second adjusting flanges. At least one restoring element is provided between the first and second adjusting flanges and generates a restoring force.

Other objects, advantages and novel features of the present invention will become apparent from the following detailed description of the invention when considered in conjunction with the accompanying drawings.

DETAILED DESCRIPTION OF THE DRAWINGS

Figure 1:
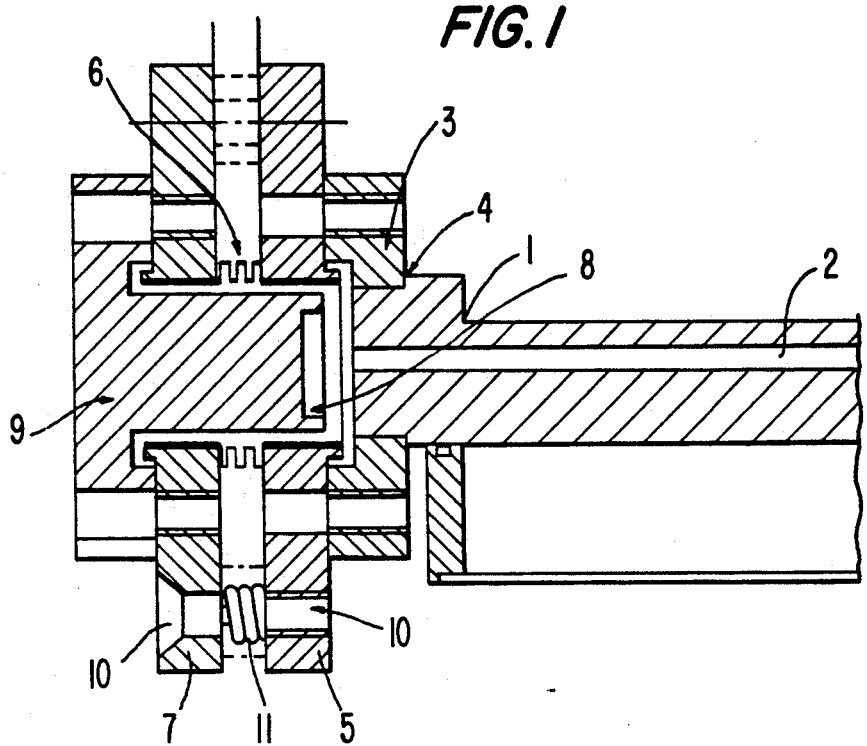
FIG. 1 is a sectional view of a first embodiment of the present invention.

FIG. 1 (partially) shows a laser tube 1 for a gas laser, this laser tube 1 consisting, for example, of $Al_2O_3$ or BeO and which has a central bore 2. On at least one of the two end faces of the laser tube 1, only one of the faces being illustrated in FIG. 1, a tube flange 3 is mounted. In the illustrated embodiment of FIG. 1, the tube flange 3 is a commercially available CF-flange and is soldered onto the laser tube 1, for example, by means of a copper-silver solder 4. A first adjusting flange 5 is connected in a gastight manner with the CF-tube flange 3 by means of a sealing device which is not shown, such as a copper or gold seal. A wavy bellows 6 is gastightly connected with the adjusting flange 5, for example, by means of a soldered or welded connection. The laser beam extends in the interior of the bellows 6.

The wavy or concertina bellows 6 is connected on its other end in a gastight manner with a second adjusting flange on which a mirror flange 9 carrying a laser mirror 8 is gastightly mounted. Preferably, the flanges 5, 7, 9 are conventional standard flanges, such as CF-UHV-flanges and have standard bores for holding screws which are not shown and with which the flanges 1 and 5 or 7 and 9 are gastightly connected. As a result, it is possible to heat the whole arrangement to the required temperatures.

Between the adjusting flanges 5 and 7, adjusting screws 10 are inserted which penetrate disk springs 11. The two adjusting flanges 5 and 7 have a larger diameter than the tube flange 3 provided on the laser tube 1 and the mirror flange 9 so that the adjusting screws 10 may be arranged outside the outer contour of the tube flange 3 and of the mirror flange 9. As a result, it is possible to tilt the second adjusting flange 7 and the mirror flange 9 which is fixedly connected with it with respect to the first adjusting flange 5 and therefore the laser tube 1, even when the flanges are already mounted. In addition, when the adjusting screws 10 are arranged in a suitable manner, an x/y-adjustment is possible.

In the illustrated embodiment, the mirror flange 9 has a projection which carries the mirror 8. It is therefore possible to position the mirror 8 as closely as possible to the laser tube 1.

Figure 2:
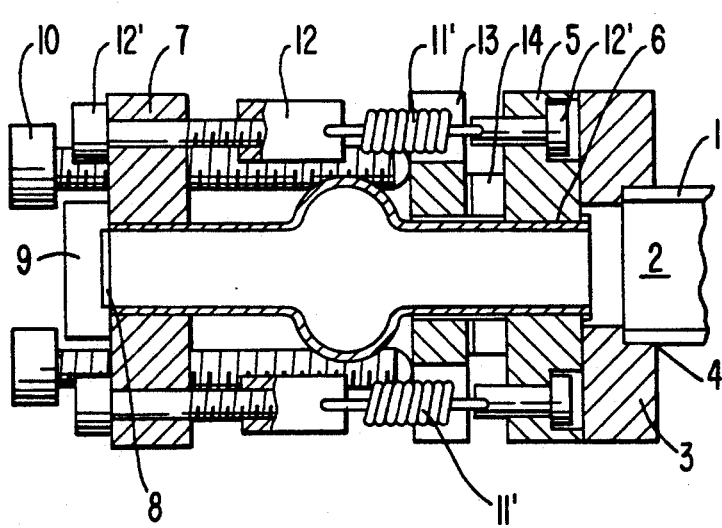
FIGS. 2 and 3 are sectional views of a second embodiment of the present invention.
Figure 3:
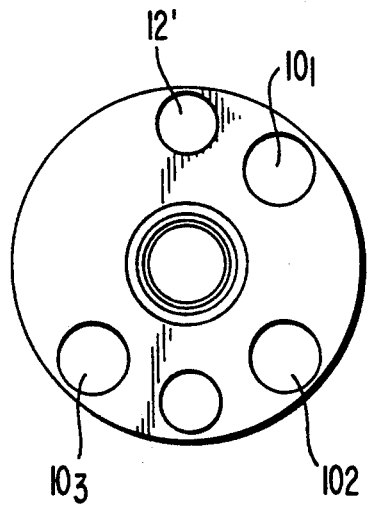

FIG. 2 is a longitudinal sectional and a top view of a second embodiment of the invention. In FIG. 2, identical or corresponding parts have the same reference number as in FIG. 1 so that these parts will not be discussed again and only deviations of the embodiment illustrated in FIG. 2 with respect to the first embodiment will be explained.

In the second embodiment of the present invention, the tube flange 3 and the two adjusting flanges 5 and 7 have the same diameter. In addition, in this embodiment, the two adjusting flanges 5, 7 are prestressed with respect to one another by tension springs 11' and spring tensioning bolts 12 which are connected with screws 12' inserted into the flanges 5 and 7. The adjusting screws $10_1$, $10_2$ and $10_3$ for the vertical, distance and horizontal adjustment are applied to a pull-off disk 13 which rests on the screwheads 14 of fastening screws, by means of which the adjusting flange 5 is fastened to the tube flange 3. In the embodiment illustrated in FIG. 2, the element 6 which is gastightly connected with the two adjusting flanges 5 and 7, for example, by means of a welded connection, is not a concertina bellows, but rather is an element which is elastic in a different manner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A laser tube for a gas laser, comprising:
   a tube flange on at least one end face of the gas laser for the detachable fastening of at least one of a laser window and of a laser mirror;
   a first adjusting flange gastightly mounted on the tube flange;
   an elastic tube-shaped element, in the interior of which the laser beam extends, said tube-shaped element being gastightly connected at a first end with the first adjusting flange;
   a second adjusting flange to which the tube-shaped element is gastightly connected at a second end of the tube-shaped element;
   a mirror flange gastightly mounted to the second adjusting flange and which carries at least one of the laser window and the laser mirror;
   at least two adjusting screws between the first and second adjusting flanges; and
   at least one restoring element, between the first and second adjusting flanges, which generates a restoring force.

2. A laser tube according to claim 1, wherein the first and second adjusting flanges have a larger diameter than the tube flange and the mirror flange, and the adjusting screws are outside an outer contour of the tube flange and an outer contour of the mirror flange.

3. A laser tube according to claim 2, wherein at least one of the first and second adjusting flanges and the tube flange are standard UHV-flanges.

4. A laser tube according to claim 3, wherein at least one of said first and second adjusting flanges comprises a gastight flange and a pull-off disk.

5. A laser tube according to claim 4, wherein the elastic element is a wavy bellows.

6. A laser tube according to claim 5, wherein the restoring element generates the restoring force on the basis of the pressure difference between the interior pressure and the exterior pressure.

7. A laser tube according to claim 6, wherein the restoring element comprises at least one spring.

8. A laser tube according to claim 7, wherein the at least one disk spring, which is penetrated by an adjusting screw.

9. A laser tube according to claim 1, wherein at least one of the first and second adjusting flanges and the tube flange are standard UHV-flanges.

10. A laser tube according to claim 1, wherein at least one of said first and second adjusting flanges comprises a gastight flange and a pull-off disk.

11. A laser tube according to claim 1, wherein the elastic element is a wavy bellows.

12. A laser tube according to claim 1, wherein the restoring element generates the restoring force on the basis of the pressure difference between the interior pressure and the exterior pressure.

13. A laser tube according to claim 12, wherein the restoring element comprises at least one spring.

14. A laser tube according to claim 13, wherein the at least one disk spring, which is penetrated by an adjusting screw.

* * * * *